United States Patent [19]

Mallick, Jr.

[11] Patent Number: 4,996,472
[45] Date of Patent: Feb. 26, 1991

[54] PASSIVE SUPERCONDUCTING QUENCH DETECTION SENSOR

[75] Inventor: George T. Mallick, Jr., Monroeville, Pa.

[73] Assignee: Westinghouse Electric Corp., Pittsburgh, Pa.

[21] Appl. No.: 401,589

[22] Filed: Aug. 31, 1989

[51] Int. Cl.$^5$ ............................................. G01N 27/00
[52] U.S. Cl. ................................ 324/71.6; 324/546; 324/71.1; 324/718; 361/141; 505/726
[58] Field of Search ...................... 324/71.1, 546, 600, 324/718, 71.6; 361/19, 141; 505/726

[56] References Cited

U.S. PATENT DOCUMENTS 4,727,316 2/1988 Shen et al. ........................... 324/127
4,868,704 9/1989 Cavero ................................. 324/522

FOREIGN PATENT DOCUMENTS 0915016 3/1982 U.S.S.R. ............................. 324/71.6

OTHER PUBLICATIONS

Bischof et al., Considerations About the Electrical Supervision of the Superconducting Field Winding of a 320 kVA Synchronous Generator, ICEM, 1984, pp. 1–5.

Primary Examiner—Reinhard J. Eisenzopf
Assistant Examiner—Robert W. Mueller
Attorney, Agent, or Firm—Michael G. Panian

[57] ABSTRACT

The present invention provides a passive superconducting sensor for quench detection in a superconducting coil. The sensor consists of a first circuit electrically connected to two voltage taps of a superconducting coil. The first circuit uses nonsuperconducting components and preferably contains a resistive element. The first circuit is magnetically coupled to a second circuit by a hybrid transformer. The second circuit is superconducting and contains a readout coil and preferably a second hybrid transformer. The second hybrid transformer is magnetically coupled to a sense coil which detects flux changes in the superconducting coil. The readout coil is coupled to a readout device which measures changes in the current through the readout coil. The current in the readout coil can be made a function only of the resistance of the superconducting coil between the voltage turns and thus can be used to detect a quench.

23 Claims, 1 Drawing Sheet

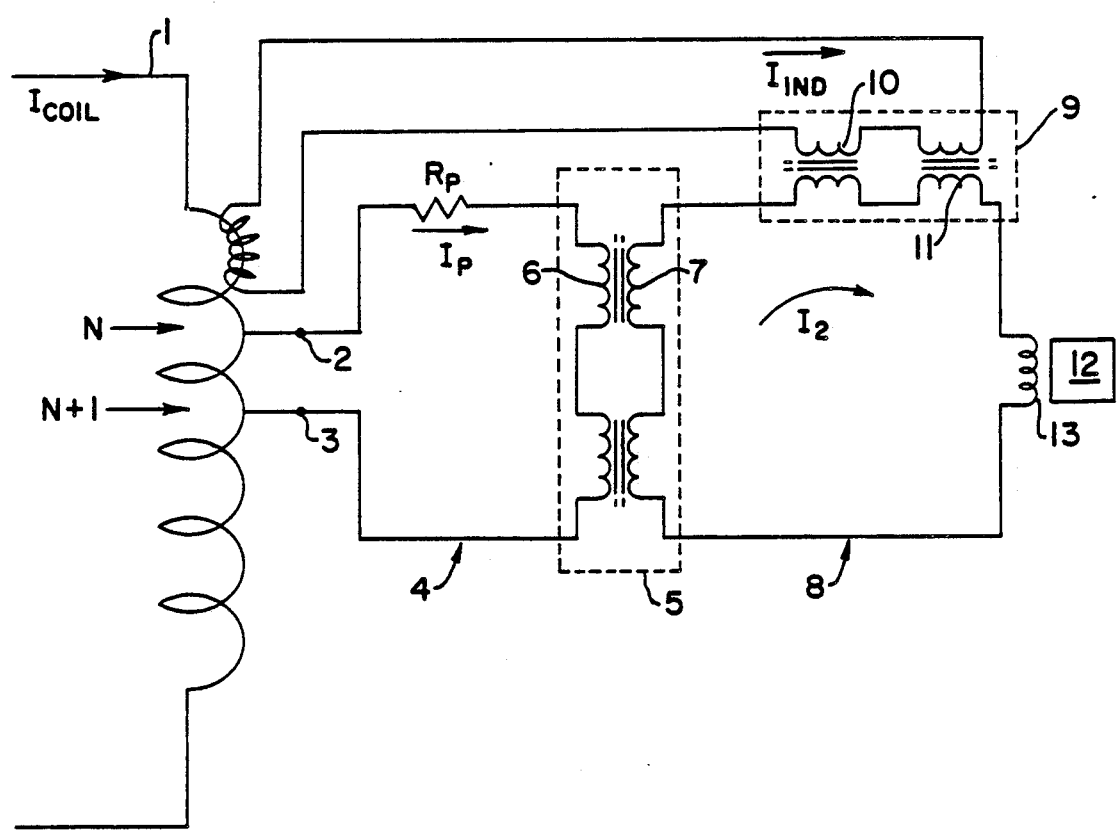

PASSIVE SUPERCONDUCTING QUENCH DETECTION SENSOR

FIELD OF THE INVENTION

The present invention relates to a sensor for detecting resistive zones or quenches in a superconductor and more particularly to a passive superconducting quench detection sensor utilizing both superconducting and nonsuperconducting components.

BACKGROUND OF THE INVENTION

Superconducting magnets and inductors are capable of generating high magnetic fields and thereby storing large amounts of energy. Superconducting inductors are very efficient for these purposes because no energy is lost to resistive or joule heating in the superconducting current path. Every superconducting material has a critical temperature $T_c$ for a given ambient magnetic field above which the material is no longer superconducting. If a region of a superconducting material loses its superconducting property (i.e. becomes normal or quenches), joule heating occurs in the normal or resistive, nonsuperconducting region. If the region is small enough or the cooling sufficient enough, the heat will be dissipated and the region will return to its superconducting state.

If the region is large, such that sufficient joule heating occurs and overcomes the system's ability to dissipate the heat, the normal zone will propagate and grow larger, causing a catastrophic condition which can result in severe damage to the inductor or magnet as even more energy is dissipated in portions of the inductor or magnet. This runaway condition can result in the uncontrolled dumping of the entire magnetic energy of the inductor or magnet into a localized region, thus causing damage to itself and possibly to the load. It could also result in a service outage of the inductor or magnet which could be intolerable if the inductor or magnet where part of a device having a critical military application. Early detection of a quench, however, permits the energy stored in the magnet or inductor to be dissipated in a controlled fashion. The energy can be dissipated in a variety of ways such as through dump resistors or by making the entire magnet or inductor go normal in a controlled fashion. Catastrophic damage due to overheating is thereby avoided.

Generally, a superconducting inductor is any current path composed of a superconducting material since any current path has a self-inductance. Superconducting inductors, and especially superconducting energy storage inductors, are generally configured as coils called solenoids or toroids. Superconducting magnets, which are a special case of superconducting inductors, often have more complex shapes, so as to appropriately shape the magnetic field they produce.

Several techniques exist for detecting and locating normal regions in a superconducting magnet or inductor. The principle technique has been the use of a series of voltage taps. Voltages are measured by voltmeters at various points along the coil of the superconducting material, with the objective of correlating changes in voltage with the changes in resistivity due to the creation of a normal region. A severe drawback with using voltage taps is that in addition to the resistive voltage associated with a normal zone, a superconducting inductor produces inductive voltages resulting from the charging and discharging of the coil. These "common mode" inductive voltages are variable and change with any changes in the magnetic field. Also, since normal zones must be detected when they are small, the resistive voltage drop resulting from a quench is very small, typically 1.0–2.0 volts; whereas the common mode inductive voltage between two voltage taps is typically much larger and can be tens of kilovolts. If voltage taps are used, some technique must be utilized to eliminate the inductive voltage from the voltage measured at the taps. Typically, this involves subtracting out the inductive voltage by comparing the signal to a reference voltage. In any event, the technique involves subtracting two voltage measurements, one entirely inductive and the other mostly inductive but also having a small resistive component, with the goal of recovering the small resistive component.

As mentioned above, the inductive voltage across the inductor's terminals may be tens of kilovolts during normal operation. This means that an effective sensor must be capable of being operated effectively at these high common mode voltages. This places a severe constraint upon any electronic components attached to the voltage taps to measure and detect a quench since these components must be designed to operate at these high inductive voltages. Also, since the components may be placed close to the voltage taps, they must operate in high magnetic fields, and preferably at cryogenic temperatures.

It would be desirable, therefore, to develop a sensor for quench detection in superconductors under operating and quiescent conditions wherein a quench can easily be detected without encountering the difficulties mentioned above, which are associated with voltage taps.

SUMMARY OF THE INVENTION

Generally, the present invention relates to a passive superconducting quench detection sensor comprising both superconducting and normal or nonsuperconducting components. The sensor uses passive components which results in a highly reliable and stable sensor with a very wide dynamic range. The wide dynamic range means that the sensitivity of the sensor is retained even in the presence of high common mode voltages from the superconducting coil such as the large inductive voltages. The present sensor also uses magnetic coupling to achieve electrical isolation and thereby eliminate the common mode voltage problem mentioned above. The sensor can operate using simple coil configurations which makes it less expensive than other sensors.

Preferably, the passive sensor of the present invention comprises a first circuit electrically connected to two preferably adjacent voltage taps of the superconducting coil wherein a quench is to be detected. The first circuit uses some nonsuperconducting elements and preferably contains a resistive element. The first circuit is magnetically coupled to a second circuit by a superconducting or hybrid first transformer. The second circuit is superconducting and has a superconducting readout coil and preferably a superconducting or hybrid second transformer in series with the first transformer. The second transformer is magnetically coupled to a coil which measures flux changes in the superconducting coil. The readout coil is magnetically coupled to a readout device which measures changes in the readout coil. The hybrid transformers for the purposes of this disclosure have primary windings made of normal or nonsuperconducting material and secondary windings made of superconducting material.

Other details, objects and advantages of the present invention will become more readily apparent from the following description of a presently preferred embodiment thereof.

BRIEF DESCRIPTION OF THE DRAWING

In the accompanying drawing, a preferred embodiment of the present invention is illustrated, by way of example only, wherein:

FIG. 1 shows a block diagram of a passive sensor of the present invention.

DESCRIPTION OF THE PREFERRED EMBODIMENT

In a superconducting coil 1 of many turns, it is often desired to detect a quench occurring between the Nth and (N+1)th turn. Voltage taps 2 and 3 may be attached to the superconducting coil 1 at the Nth and (N+1)th position, respectively, and form part of a first circuit 4 which also includes a resistive element $R_p$ and a first transformer 5 in series therewith. Transformer 5 may be a superconducting transformer or a hybrid transformer. Resistive element $R_p$ acts to limit the current in the first circuit 4 and assists in determining the sensitivity of the sensor. If the first transformer is superconducting, all of the heat loss in first circuit 4 will be concentrated in $R_p$. A current $I_p$ will flow in the first circuit which is proportional to the voltage impressed across it (i.e. between the voltage taps at turns N and N+1) since the inductive reactance of the primary windings 6 of the first transformer 5 is low. Preferably, the primary windings 6 are made from two identical sections which are physically aligned in such a way that they couple to any external fields (i.e. the field of the superconducting coil) in a bucking mode. As a result of this construction, the primary windings 6, as a whole, do not effectively couple to any external fields.

The secondary windings 7 of the first transformer 5 are configured in a way similar to the primary windings 6, inasmuch as they are designed to couple only to the primary windings 6 and not to any external fields. An important difference, however, between the primary windings 6 and the secondary windings 7 is that the secondary windings 7 must be made from superconducting wire. Indeed, the entire second circuit 8, which is connected to the secondary windings 7 of the first transformer 5 is made from superconducting components. By virtue of the zero resistance of the second circuit 8, an induced current will flow therein due to the coupling of the magnetic flux from the first circuit 4 to the second circuit 8 through transformer 5. A current $I_{21}$ will flow in the second circuit 8 which is proportional to the current $I_p$ in the primary, even at zero frequency.

The total current flowing in the second circuit 8 is $I_2=I_{21}+I_{22}$. $I_{21}$ is the component of current flowing in the second circuit 8 which is precisely proportional to the voltage between the Nth and (N+1)th turns of the superconducting coil 1. This current flows without a direct physical connection between the second circuit 8 and the voltage taps 2 and 3, thereby effectively eliminating the common mode voltage problem. An expression for $I_{21}$ can be written as follows:

$$I_{21} = M_{12} \cdot I_p$$
$$= M_{12} \cdot V_n/R_p$$
$$= \frac{M_{12}}{R_p}\left[I_{coil} \cdot R_n + L_n \cdot \frac{dI_{coil}}{dt}\right]$$

where $M_{12}$ is the mutual inductance of the first transformer 5, $V_n$ is the voltage between the voltage taps 2 and 3, $I_{coil}$ is the current flowing in the superconducting coil 1, $L_n$ is the inductance of the superconducting coil 1 between voltage taps 2 and 3, and $R_n$ is the resistance of the superconducting coil 1 between voltage taps 2 and 3.

Other currents may also be inductively coupled into the second circuit 8. For example, a second hybrid transformer 9 may be constructed with a primary winding 10 made of nonsuperconducting wire having a high primary resistance compared to its inductive reactance. The primary winding 10 will be connected in a loop circuit which couples to the current flowing in the superconducting coil 1. Voltage will be induced in this loop circuit according to Lenz's law, and will produce a current $I_{ind}$ in the primary 10 of the second transformer 9 which is precisely proportional to $dI_{coil}/dt$. The secondary 11 of the second transformer 9 is made of superconducting material and is connected in series with the secondary 7 of the first transformer 5. An expression for the component of current ($I_{22}$) which is caused in the second circuit 8 by the second transformer 9 may be written as:

$$I_{22}=M_{22} I_{ind}=\alpha M_{22} dI_{coil}/dt$$

where $M_{22}$ is the mutual inductance in the second transformer 9 and $\alpha$ is a constant.

If the proportionality constants are properly chosen by physical positioning and dimensions, then the resultant current in the second circuit 8 can be made dependent only on the resistive voltage drop between the voltage taps 2 and 3.

$$I_2 = I_{21} + I_{22} = \frac{M_{12} I_{coil} R_n}{R_p} +$$

$$\left(\frac{M_{12}}{R_p} L_n + \alpha M_{22}\right) dI_{coil}/dt = AR_n + B\frac{dI_{coil}}{dt};$$

$$B = 0 \text{ if } M_{12}\frac{L_n}{R_p} = -\alpha M_{22}$$

The resistive voltage drop $R_n$ changes, of course, when the quench occurs. In the superconducting state, $R_n=0$, but when a quench occurs, $R_n\neq 0$.

The current $I_2$ in the second circuit 8 may be sampled at cryogenic temperatures by means of a readout device 12 such as a Hall effect sensor, which samples at DC, or since the static performance of the sensor is not of interest, more conventional electronics can be used as the readout device 12 to observe changes in the current of the readout coil 13 on a time scale of one second or faster.

The passive superconducting sensor is capable of operating in very high magnetic fields, however, it would also be possible to construct a shield of superconducting material which would provide a low field environment for the sensor and its transformers 5 and 9. This would make it easier to avoid any coupling between them and the field of the superconducting coil 1. This increases the sensitivity of the sensor. If a second transformer 9 is used, the system will be very insensitive to the high inductive voltages which may be present at various times on the superconducting coil. Fine tuning the balance of the sensor if necessary, may readily be accomplished by means of mechanical manipulation of superconducting vanes, or coil positioning. Once set up, readjustment will seldom be required, and the sensor will remain in calibration.

Preferably one sensor is used to detect a quench between one pair of voltage taps 2 and 3 on the superconducting coil 1 to provide maximum localization of the quench. It is entirely feasible, however, to connect the second circuits 8 of a number of such sensors in series, thus losing the localizing information, but retaining sensitivity to a quench anywhere in the superconducting coil 1.

While a presently preferred embodiment of practicing the invention has been shown and described with particularity in connection with the accompanying drawings, the invention may otherwise be embodied within the scope of the following claims.

What is claimed is:

1. A passive superconducting sensor for detecting a quench in a superconducting coil having a plurality of voltage taps comprising: a first circuit having electrically connected in series two voltage taps of the superconducting coil, a series resistive element $R_p$, and a primary of a first transformer; a second circuit of superconducting elements having connected in series a secondary of the first transformer and a readout coil such that the second circuit is magnetically coupled to the first circuit by the first transformer, a readout device magnetically coupled to the readout coil for measuring a change in a current flow therein; and a second transformer having a superconducting secondary in series with the second circuit and being magnetically coupled to a primary winding in a loop circuit which detects flux changes in the superconducting coil.

2. The passive superconducting sensor as described in claim 1 wherein the first transformer is a hybrid transformer.

3. The passive superconducting sensor as described in claim 1 wherein the first transformer is a superconducting transformer.

4. The passive superconducting sensor as described in claim 1 wherein the second transformer is a hybrid transformer.

5. The passive superconducting sensor as described in claim 1 wherein the second transformer is a superconducting transformer.

6. The passive superconducting sensor as described in claim 1 wherein the readout device is a Hall effect sensor.

7. The passive superconducting sensor as described in claim 1 wherein the sensor is operated at cryogenic temperatures.

8. The passive superconducting sensor as described in claim 1 wherein the sensor is operated in a low magnetic field environment created by a shield of superconducting material.

9. A passive superconducting sensor for detecting a quench in a superconducting coil having a plurality of voltage taps comprising: a first circuit having electrically connected in series two voltage taps of the superconducting coil and a primary of a first transformer; a second circuit of superconducting elements having connected in series a secondary of the first transformer and a readout coil such that the second circuit is magnetically coupled to the first circuit by the first transformer; a readout device magnetically coupled to the readout coil; and a second transformer having a superconducting secondary in series with the second circuit and being magnetically coupled to a primary winding in a loop circuit which detects flux changes in the superconducting coil.

10. A passive superconducting sensor as described in claim 9 wherein the first circuit further comprises a series resistive element $R_p$.

11. The passive superconducting sensor as described in claim 10 wherein the first transformer is a hybrid transformer.

12. The passive superconducting sensor as described in claim 11 wherein the first transformer is a superconducting transformer.

13. The passive superconducting sensor as described in claim 9 wherein the readout device measures a change in a current flowing in the readout coil.

14. The passive superconducting sensor as described in claim 13 wherein the readout device is a Hall effect sensor.

15. The passive superconducting sensor as described in claim 9 wherein the second transformer is a hybrid transformer.

16. The passive superconducting sensor as described in claim 9 wherein the second transformer is a superconducting transformer.

17. The passive superconducting sensor as described in claim 9 wherein the sensor is operated at cryogenic temperatures.

18. The passive superconducting sensor as described in claim 9 wherein the sensor is operated in a low magnetic field environment created by a shield of superconducting material.

19. A passive superconducting sensor operable at cryogenic temperatures for detecting a quench in a superconducting coil having a plurality of voltage taps comprising: a first circuit having electrically connected in series two voltage taps of the superconducting coil and a primary of a first transformer; a second circuit of superconducting elements having connected in series a secondary of the first transformer and a readout coil such that the second circuit is magnetically coupled to the first circuit by the first transformer; a readout device magnetically coupled to the readout coil; a second transformer having a superconducting secondary in series with the second circuit and being magnetically coupled to a primary winding in a loop circuit which detects flux changes in the superconducting coil; wherein the sensor is operated in a low magnetic filed environment created by a shield of superconducting material.

20. A passive superconducting sensor as described in claim 19 wherein the first circuit further comprises a series resistive element $R_p$.

21. The passive superconducting sensor as described in claim 20 wherein the readout device is a hall effect sensor for measuring a change in a current flowing in the readout coil.

22. The passive superconducting sensor as described in claim 19 wherein said first and second transformers are hybrid transformers.

23. The passive superconducting sensor as described in claim 19 wherein said first and second transformers are superconducting transformers.

* * * * *